(12) United States Patent
Kang et al.

(10) Patent No.: US 9,198,047 B2
(45) Date of Patent: Nov. 24, 2015

(54) METHOD AND APPARATUS FOR TRANSCEIVING SIGNALS IN A DISTRIBUTED ANTENNA SYSTEM

(71) Applicant: LG ELECTRONICS INC., Seoul (KR)

(72) Inventors: Ji Won Kang, Anyang-si (KR); Bin Chul Ihm, Anyang-si (KR); Jin Young Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/446,610

(22) Filed: Jul. 30, 2014

(65) Prior Publication Data

US 2014/0364113 A1    Dec. 11, 2014

Related U.S. Application Data

(60) Division of application No. 13/575,020, which is a continuation of application No. PCT/KR2011/000434, filed on Jan. 21, 2011, now Pat. No. 8,867,446.

(60) Provisional application No. 61/298,157, filed on Jan. 25, 2010.

(30) Foreign Application Priority Data

May 20, 2010   (KR) .................. 10-2010-0047326

(51) Int. Cl.
| | | |
|---|---|---|
| *H04Q 7/00* | (2006.01) | |
| *H04W 16/14* | (2009.01) | |
| *H04B 7/06* | (2006.01) | |
| *H04B 7/02* | (2006.01) | |
| *H04B 7/04* | (2006.01) | |
| *H04W 16/26* | (2009.01) | |

(52) U.S. Cl.
CPC ............... *H04W 16/14* (2013.01); *H04B 7/022* (2013.01); *H04B 7/061* (2013.01); *H04B 7/0417* (2013.01); *H04B 7/0626* (2013.01); *H04B 7/0639* (2013.01); *H04B 7/0691* (2013.01); *H04W 16/26* (2013.01)

(58) Field of Classification Search
None
See application file for complete search history.

(56) References Cited

U.S. PATENT DOCUMENTS

| | | | |
|---|---|---|---|
| 7,162,261 B1 | 1/2007 | Yarkosky et al. | |
| 7,760,699 B1 | 7/2010 | Malik | |
| 2004/0071202 A1* | 4/2004 | Won et al. ...................... | 375/227 |
| 2006/0276227 A1 | 12/2006 | Dravida | |
| 2008/0205538 A1 | 8/2008 | Han et al. | |
| 2008/0212703 A1 | 9/2008 | Han et al. | |
| 2008/0248805 A1 | 10/2008 | Han et al. | |
| 2009/0111473 A1* | 4/2009 | Tao et al. ...................... | 455/440 |
| 2009/0279623 A1* | 11/2009 | Wu et al. ....................... | 375/260 |

(Continued)

FOREIGN PATENT DOCUMENTS

KR   10-2009-0088083    8/2009

*Primary Examiner* — Duc C Ho

(74) *Attorney, Agent, or Firm* — Lee, Hong, Degerman, Kang & Waimey

(57) ABSTRACT

The present invention relates to a terminal which receives signals from a base station, and to a method in which the terminal receives signals from the base station in a distributed antenna system (DAS). The terminal receives, from the base station having a plurality of antennas, control information on one or more active transmission antennas allocated to the terminal, from among the plurality of antennas, and receives signals from the base station via said one or more active transmission antennas.

8 Claims, 9 Drawing Sheets

(56) References Cited

U.S. PATENT DOCUMENTS

| | | |
|---|---|---|
| 2009/0316807 A1 | 12/2009 | Kim et al. |
| 2010/0150013 A1* | 6/2010 | Hara et al. ............. 370/252 |
| 2010/0178927 A1* | 7/2010 | Kim et al. ............. 455/450 |
| 2010/0246515 A1* | 9/2010 | Tsai et al. ............. 370/329 |
| 2011/0026482 A1* | 2/2011 | Li et al. ............. 370/329 |
| 2011/0110442 A1 | 5/2011 | Wu et al. |
| 2011/0116411 A1* | 5/2011 | Hwang et al. ............. 370/252 |
| 2012/0026966 A1 | 2/2012 | Wennstrom et al. |
| 2012/0170542 A1 | 7/2012 | Zangi |
| 2012/0188881 A1 | 7/2012 | Ma et al. |

* cited by examiner

METHOD AND APPARATUS FOR TRANSCEIVING SIGNALS IN A DISTRIBUTED ANTENNA SYSTEM

CROSS-REFERENCE TO RELATED APPLICATIONS

This application is a divisional of U.S. patent application Ser. No. 13/575,020, filed on Jul. 24, 2012, now U.S. Pat. No. 8,867,446, which is the National Stage filing under 35 U.S.C. 371 of International Application No. PCT/KR2011/000434, filed on Jan. 21, 2011, which claims the benefit of earlier filing date and right of priority to Korean Application No. 10-2010-0047326, filed on May 20, 2010, and also claims the benefit of U.S. Provisional Application Ser. No. 61/298,157, filed on Jan. 25, 2010, the contents of which are all incorporated by reference herein in their entirety.

TECHNICAL FIELD

The present invention relates to a wireless communication system, and more particularly, to a method and apparatus for transceiving signals in a distributed antenna system.

BACKGROUND ART

Recently, the ongoing development of information industry demands a technology of transmitting large-scale data of various types at high speed. To this end, many ongoing efforts are made to research and develop DAS for the solution to the shadow region problem and the coverage extension by means of a plurality of distributed antennas provided within a conventional cell.

Distributed antenna system (hereinafter abbreviate DAS) is the system that utilizes a plurality of distributed antennas connected with a single base station via wired or dedicated circuit. In this case, the single base station manages a plurality of antennas situated within a cell managed by the base station in a manner of being spaced apart from each other over a predetermined distance. Considering the fact that a plurality of the antennas are distributed and situated within the cell in a manner of being spaced from each other over the predetermined space, the distributed antenna system is discriminated from a centralized antenna system (hereinafter abbreviated CAS). The CAS includes such a cellular communication system as WCDMA (wideband code division multiple access), HSPA (high speed packet data), LTE/LTE-A (long term evolution/long term evolution-advanced) and 802.16. And, the CAS is the system that uses such a multi-antenna scheme as OL-MIMO (open loop-multi input multi output), CL-SU-MIMO (close loop-single user-multi input multi output), CL-MU-MIMO (close loop-multi user-multi input multi output), Multi-BS-MIMO (multi-base station-multi input multi output) and the like in a manner of installing multiple antennas on a single base station in a cell based structure.

The DAS may differ from a femto cell in that a base station at a cell center controls and manages all distributed antenna areas situated within a cell instead of enabling each unit of distributed antennas to control and manage an area of the corresponding antenna. Considering the fact that the distributed antenna units are connected via the wired or dedicated circuit, the DAS may differ from a multi-hop relay system or an ad-hoc network in which a base station and a remote station (RS) are connected by wireless. Moreover, considering the fact that the distributed antennas are able to transmit different signals to user equipments adjacent to the corresponding antennas, respectively, the DAS is discriminated from a repeater that amplifies and transmits a signal only.

Considering that distributed antennas are able to support a single mobile station or multiple mobile stations by transceiving different data stream at the same time, the DAS may be considered as a sort of a multiple input multiple output (MIMO) system. In aspect of MIMO system, the DAS may provide an effect of reducing transmission power owing to the antennas distributed to various locations within a cell in a manner that a transmission area of each antenna is reduced smaller than that of the CAS. Moreover, the DAS enables fast data transmission by decreasing a path loss through a reduction of a transmission distance between an antenna and a user equipment, thereby raising transmission capacity and power efficiency of a cellular system. And, the DAS may satisfy a communication performance quality relatively more uniform that that of the CAS irrespective of a user's location within a cell. Moreover, since a base station is connected with a plurality of distributed antennas via the wired or dedicated circuit, the DAS has small signal loss and lowered inter-antenna correlation and interference to provide a high signal to interference plus noise ratio (SINR).

Thus, the DAS reduces the costs for base station expansion and backhaul network maintenance in a next generation mobile communication system and extends a service coverage, and enhances channel capacity and SINR, thereby becoming a new base of a cellular communications together with the conventional CAS or by being substituted for the CAS.

DISCLOSURE OF THE INVENTION

Technical Problem

Accordingly, the present invention is directed to substantially obviate one or more problems due to limitations and disadvantages of the related art. First of all, an object of the present invention is to provide a method of performing a communication, in which a base station transmits system related control information to user equipments entering a DAS cell to support DAS.

Another object of the present invention is to provide a method of performing a communication in a manner of transmitting information on a distributed antenna independently assigned per user equipment or an antenna group due to DAS properties, information on a pilot pattern per antenna and the like.

Another object of the present invention is to provide a method for a user equipment having entered a DAS cell to create and transmit feedback information including antenna related information in order for a DAS base station to efficiently allocate antenna resource per user equipment.

A further object of the present invention is to provide a method of performing channel estimation by converting a pilot pattern index transmitted by a DAS base station to be used for each user equipment to a consecutively enumerated logical antenna index, by which a user equipment can perform channel estimation efficiently.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of receiving a signal, which is received from a base station by a user equipment in a distributed antenna system (DAS), according to one embodiment of the present invention may include a step 1) of receiving control information on at least one effective transmitting antenna allocated to the user equipment among a plurality of antennas from the base station including the plurality of antennas and a step 2) of receiving the signal via the at least one effective transmitting antenna from the base station.

To further achieve these and other advantages and in accordance with the purpose of the present invention, a user equipment in a distributed antenna system (DAS) according to one embodiment of the present invention may include a receiving module configured to receive a signal, a processor configured to generate a feedback information on a distributed antenna of a base station used for a downlink transmission based on a downlink signal received from the base station including a plurality of antennas spaced apart from a predetermined distance via the receiving module and a transmitting module configured to transmit the feedback information to the base station, wherein the processor is configured to receive control information on at least one effective transmitting antenna to be used for a communication with the user equipment among the plurality of antennas from the base station via the receiving module.

According to each embodiment of the present invention, the control information may include at least one selected from the group consisting of information on the number of the at least one effective transmitting antenna, index information of the at least one effective transmitting antenna and received signal strength information for each of the plurality of antennas.

According to each embodiment of the present invention, the method may further include the step of mapping at least one PAI to logical antenna indexes (LAI) according to a predetermined mapping rule. And, the predetermined mapping rule may configure the LAI with an index of the effective transmitting antenna in performance order according to a power gain for each effective transmitting antenna.

According to each embodiment of the present invention, the control information may include at least one selected from the group consisting of information on one or more pilot pattern indexes (PPI) supportive of the user equipment and information on PPI having an interference influence on the user equipment.

According to each embodiment of the present invention, the method may further include the step of transmitting feedback information including antenna related information used for a transmission of a downlink signal based on the downlink signal received from the base station by the user equipment to the base station before the step 1). In this case, the control information may be determined by the base station based on the feedback information.

According to each embodiment of the present invention, the feedback information may include at least one selected from the group consisting of a received signal strength for each of the plurality of antennas, a signal received signal strength for at least one antenna selected from the plurality of antennas by the user equipment, information on the number and/or indexes of antennas meeting a predetermined selection reference, and candidate PPI meeting a predetermined selection reference.

And, the predetermined selection reference comprises whether a received signal strength of the downlink signal received via a portion of the plurality of antennas is equal to or greater than a reference value.

According to each embodiment of the present invention, the feedback information may include preferred pilot pattern indexes (PPPI) requested by the user equipment and the PPPI may include at least one PPI in which a received signal strength or a channel gain of a channel estimated via a common pilot transmitted from the base station meets a value equal to or greater than a predetermined reference value.

According to each embodiment of the present invention, the feedback information may further include at least one selected from the group consisting of channel state information estimated from each PPI included in the PPPI, a preferred order of at least one PPI included in the PPPI, a specific number of most preferred PPIs among the at least one PPI included in the PPPI, and channel state information on the specific number of the most preferred PPIs.

According to each embodiment of the present invention, the specific number of the most preferred PPI may correspond to one selected from the group consisting of system configuration parameter information, indication information determined and transmitted by the base station, and information arbitrarily determined by the user equipment.

According to each embodiment of the present invention, the control information may include at least one selected from the group consisting of information on specific pilot pattern indexes (PPI) supportive of the user equipment, an index set (excluded PPI: e-PPI) supposed to be excluded from the candidate PPI or the PPPI fed back from the user equipment, and an index agreement indicator indicating whether PPI equal to the candidate PPI or the PPPI fed back from the user equipment is used.

According to each embodiment of the present invention, if the index agreement indicator is set to indicate the information indicating that the PPI equal to the candidate PPI or the PPPI fed back from the user equipment is used, the control information may not include information on the specific PPI and the e-PPI.

According to each embodiment of the present invention, the method may further include the step of mapping the specific PPI to LAI by a predetermined mapping rule. And, the predetermined mapping rule may include configuring the LAI in performance order according to power gain for each of the PPI.

In this case, the method may further include the steps of estimating channel related information based on the LAI and transmitting the channel related information to the base station by feedback. Alternatively, the method may further include the step of transmitting information on the predetermined mapping rule to the base station.

According to each embodiment of the present invention, the control information may be independently configured for each user equipment belonging to the DAS and the control information may be determined independently in accordance with at least one of a location of the user equipment and a frequency band used by the user equipment.

According to each embodiment of the present invention, the method may further include the step of receiving indication information indicating that the system supports at least one of the DAS and a centralized antenna system from the base station when the user equipment enters a cell area in which the base station provides a service. In this case, the indication information may be transmitted via cell ID.

According to the above-described embodiments of the present invention, an antenna or an antenna group may be used together with an antenna port in LTE/LTE-A.

The above embodiments are just parts of preferred embodiments of the present invention. And, it is to be understood that both the foregoing general description and the following detailed description are exemplary and explanatory and are intended to provide further explanation of the invention as claimed.

Advantageous Effects

According to the above-described embodiments of the present invention, a communication can be performed in a manner that a DAS base station transmits system related control information to user equipments entering a DAS cell.

According to the above-described embodiments of the present invention, a DAS base station can perform a communication in a manner of transmitting information on a distributed antenna or an antenna group independently assigned for each user equipment due to DAS properties, information on a pilot pattern for each antenna and the like.

According to the above-described embodiments of the present invention, a user equipment can generate and transmit feedback information including antenna related information in order for a DAS base station to efficiently allocate antenna resource for each user equipment.

According to the above-described embodiments of the present invention, a user equipment can efficiently perform a channel estimation by converting a pilot pattern index transmitted by a DAS base station to be used for each user equipment to a consecutively enumerated logical antenna index.

Effects obtainable from the present invention may be non-limited by the above mentioned effect. And, other unmentioned effects, objects and features of the present invention can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made exemplarily using IEEE 802.16 system for clarity, the following descriptions are applicable to various wireless communication systems including 3GPP ($3^{rd}$ generation partnership project) system and the like.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like. And, assume that a base station is a common name of such a random node of a network stage configured to communicate with a terminal as a Node B, an eNode B, a BS, a processing server (PS) and the like.

Figure 1:
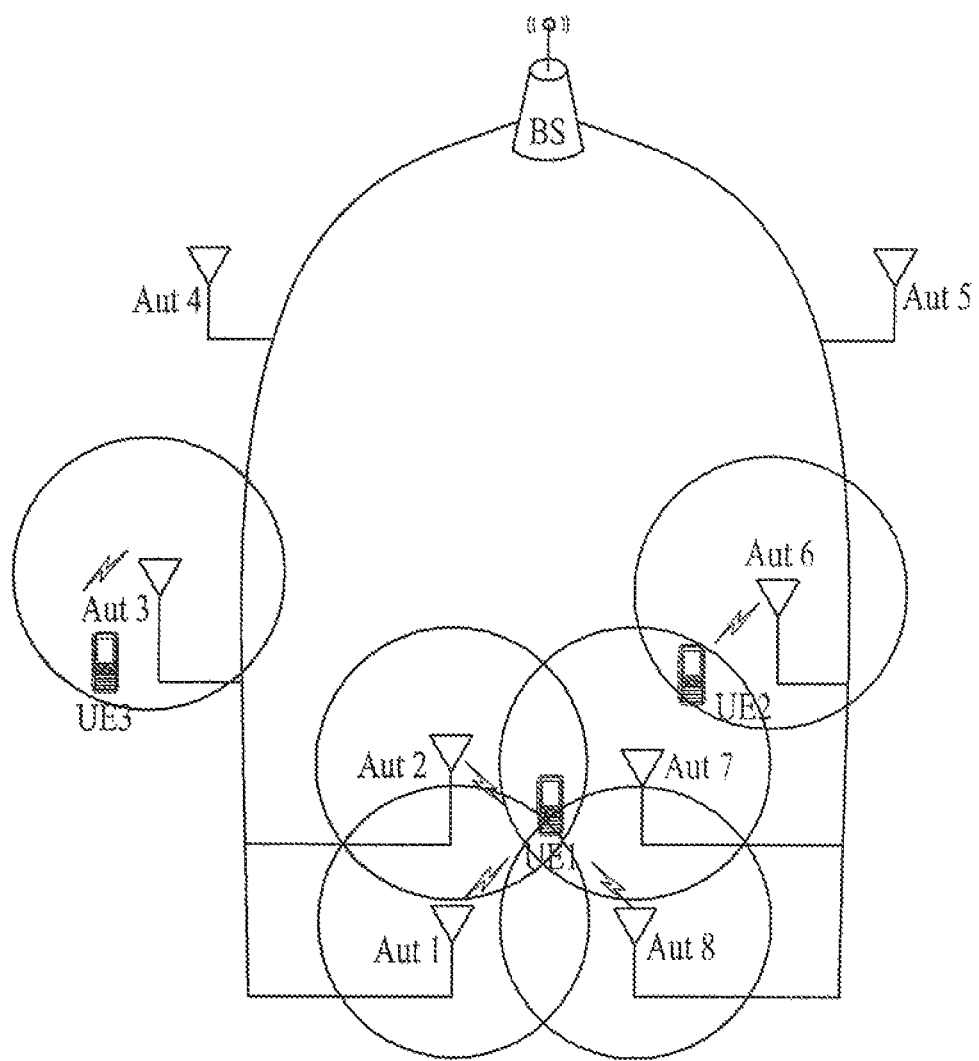
FIG. 1 is a diagram for one example of a DAS structure for the application of the present invention.

FIG. 1 is a diagram for one example of a DAS structure for the application of the present invention.

First of all, a base station shown in FIG. 1 may include a plurality of antennas situated at a cell center in accordance with CAS. For clarity of the following description, DAS antennas are shown in FIG. 1 only. In DAS, a plurality of antennas connected by wire with a single base station located in a cell are distributed at various locations within the cell. And, the DAS can be implemented in various ways in accordance with the number and locations of the antennas. For instance, a plurality of antennas may be distributed within a cell be being spaced evenly apart from each other or at least two antennas may be intensively located at a specific place. In the DAS, no matter what kind of formation is made in a cell by the distributed antennas, when the coverage of the antennas are overlapped, a signal transmission over a rank 2 becomes possible. In this case, a rank indicates the number of data streams simultaneously transmittable via at least one antenna.

Referring to FIG. 1, a single base station providing a service for a single cell area is connected by wire with total 8 antennas. And, the respective antennas may be situated in a cell in a manner of being spaced apart from each other over a predetermined distance by a predetermined interval or various intervals. In DAS, it may be unnecessary to use all antennas connected with a base station. And, an appropriate number of antennas may be useable based on a signal transmission range of each antenna, a coverage overlapping extent with an adjacent antenna, an effect of interference with an adjacent antenna, a distance between an antenna and a mobile station (or user equipment) and the like.

For instance, referring to FIG. 1, when 3 user equipments UE 1 to UE 3 are located within a cell and the UE 1 is situated within signal transmission ranges of antennas 1, 2, 7 and 8, the UE 1 may be able to receive signals from at least one of the antennas 1, 2, 7 and 8. On the other hand, in aspect of the UE 1, since each of antennas 3, 4, 5 and 6 has a considerable interval between an antenna and a user equipment, it may be highly possible to generate a path loss and increase power consumption. And, a signal transmitted from each of the antennas 3, 4, 5 and 6 may have a negligible value.

For another instance, since the UE 2 is located in a part where the signal transmission range of the antenna 6 overlaps with that of the antenna 7, a signal transmitted via another antenna except the antenna 6 and the antenna 7 is negligibly small or weak. Since the UE 3 is located within an adjacent distance of the antenna 3, it may be able to exclusively receive signals transmitted via the antenna 3.

In the DAS, as shown in FIG. 1, if locations of a plurality of antennas are spaced far apart from each other within a cell, the DAS may work line MIMO system. The base station communicates with the UE 1 via an antenna group 1 consisting of at least one of the antennas 1, 2, 7 and 8, communications with the UE 2 via an antenna group 2 consisting of at least one of the antenna 6 and the antenna 7, and communicates with the UE 3 via the antenna 3, at the same time. In doing so, the antenna 4 and the antenna 5 performs transmission for the UE 3 and the UE 2, respectively, or may operate by being turned off.

In particular, in the DAS (distributed antenna system), the number of data streams transmitted per user equipment in case of the communication with a single user or multiple users may be diversified and antenna or antenna group allocated to each user equipment located within a cell serviced by a base station may exist in various ways. In accordance with a location or located place of the mobile station situated within the cell, it may be able to specify the antenna or the antenna group, which performs communication with the corresponding user equipment. Yet, the antenna or the antenna group may be adaptively changeable in accordance with the movement of the mobile station within the cell.

Figure 2:
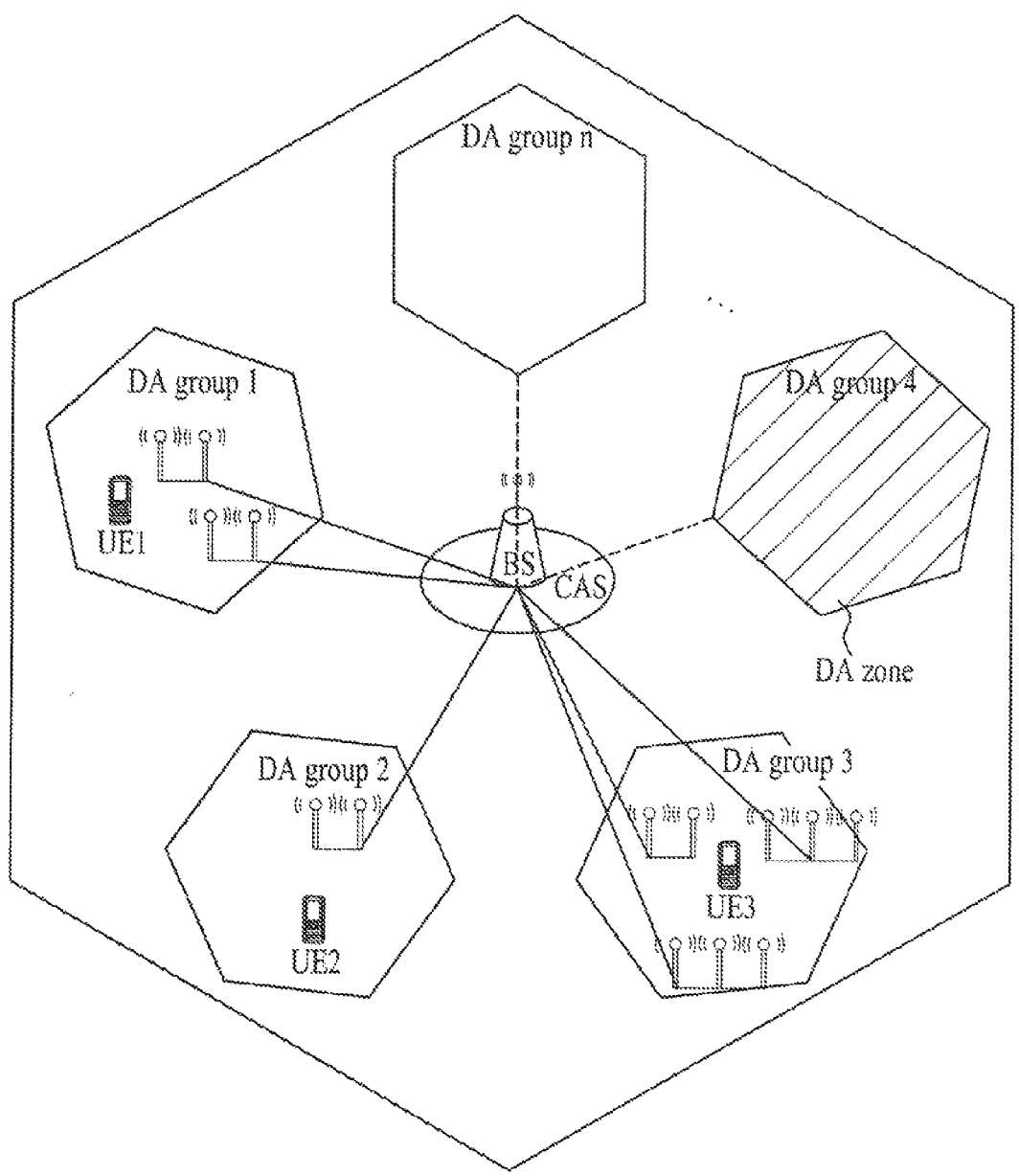
FIG. 2 is a diagram for another example of a DAS structure for the application of the present invention.

FIG. 2 is a diagram for another example of a DAS structure for the application of the present invention. In particular, FIG. 2 shows one example of a system structure when DAS is applied to a centralized antenna system that uses the cell based multiple antennas of the related art.

Referring to FIG. 2, in a cell area for a base station to provide a service, since an antenna interval at a central part of the cell area adjacent to the base station is very small in comparison with a cell radius, a plurality of centralized antennas (CAs) having such a similar effect as a path loss and the like may be located. Moreover, in an overall area of the cell, since an antenna interval is wider than that of CA, a plurality of distributed antennas (DAs) having such a different effect per antenna as a path loss and the like may be located in a manner of being spaced apart over a predetermined distance from each other.

The DA consists of at least one antenna connected with a base station by wire and may be used for the same meaning of a DAS antenna node or an antenna node. In particular, the antenna node includes at least one antenna and the at least one antenna configuring each antenna node is connected by wire as well. At least one or more DAs form a DA group to construct a DA zone.

The DA group includes at least one DA. The DA group may be configured variably in accordance with a location of a user equipment, a reception state or the like or may be configured fixedly with the maximum number of antennas used in MIMO. According to IEEE 802.16m, the maximum antenna number amounts to 8 Tx. The DA zone is defined as a range for antennas configuring the DA group to transmit or receive signals. The cell area shown in FIG. 2 includes n DA zones. A user equipment belonging to the DA zone may be able to perform communication with at least one DA configuring the DA zone. And, a base station may be able to raise a transmission rate using both DA and CA simultaneously in case of transmitting a signal to the user equipment belonging to the DA zone.

FIG. 2 shows CAS including DAS to enable a base station and a user equipment to use the DAS in CAS structure using multiple antennas of the related art. Locations of CA and DAs are illustrated in a manner of being discriminated from each other for clarity, by which the locations are non-limited. And, the CA and DAs may be located in various ways in accordance with an implementation type.

Thus, in DAS, the number of data streams per user equipment may exist variously in case of SU/MU MIMO communication, a specific antenna or a specific antenna group may be allocated to each user equipment, and a specific antenna or a specific antenna group allocated to a corresponding user equipment may be changed by real time.

Therefore, when a user equipment enters a cell area in which a service is provided by a DAS supportive system, the present invention intends to propose a DAS operating method for a base station of DAS system to determine a specific antenna or a specific antenna group supportive of a communication with the corresponding user equipment and the DAS operating method for transceiving signals between a base station and a user equipment belonging to the DAS via signaling of the determination.

In this specification, a transmitting antenna of DAS may become the at least one distributed antenna or the antenna group mentioned in the foregoing description or may be interchangeably used together with the DA or the DA group mentioned in the foregoing description.

In case that LTE/LTE-A system supports DAS, the antenna or the antenna group described with reference to FIG. 1 or FIG. 2 may be interchangeably used together with at least one antenna port. In the following description of the embodiments of the present invention, an antenna or pilot pattern may be substituted with an antenna port.

1. 1$^{st}$ Embodiment

Antenna Resource Allocation Via Uplink Signal Measurement

In a DAS operating method according to one embodiment of the present invention, a DAS base station may be able to determine a specific antenna or a specific antenna group used for a downlink signal transmission to a user equipment based on an uplink signal transmitted from the user equipment.

Figure 3:
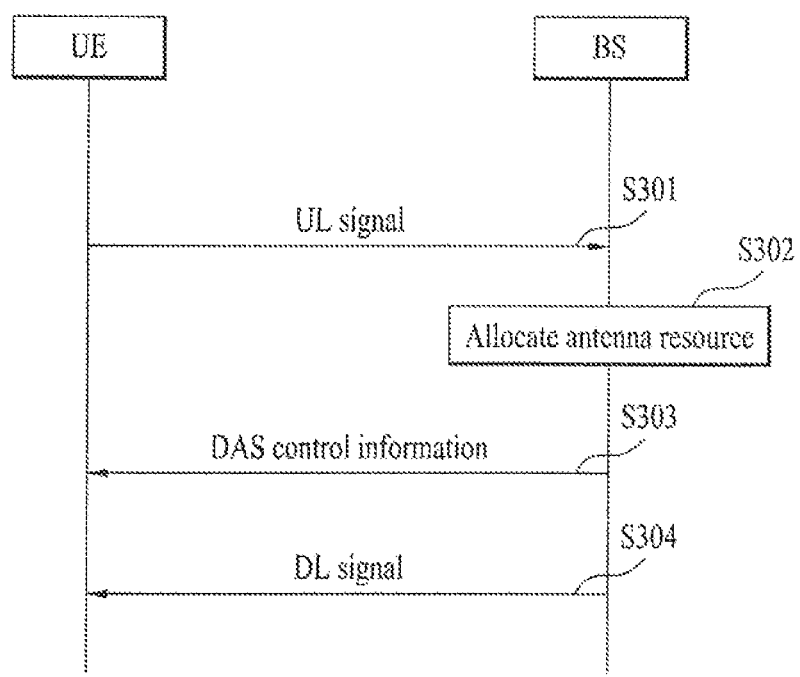
FIG. 3 is a diagram for one example of a process for transceiving signals between a base station and a user equipment in DAS according to one embodiment of the present invention.

FIG. 3 is a diagram for one example of a process for transceiving signals between a base station and a user equipment in DAS according to one embodiment of the present invention.

Referring to FIG. 3, a base station belonging to a DAS according to one embodiment of the present invention receives an uplink (UL) signal such as data, pilot, feedback information, ACK/NACK (acknowledgement/no-acknowledgement) signal and the like from a user equipment having entered a cell area in which the base station provides a service [S301].

The base station then may determine a transmitting antenna for the corresponding user equipment among all antennas based on a result of measuring a strength of the received UL signal. According to this transmitting antenna determination, it may be able to allocate an antenna resource in consideration of various conditions including a load state of the base station, intra-cell distribution of user equipments, cooperation with an adjacent cell and the like. For instance, by the antenna resource allocation, at least one transmitting antenna may be finally determined for each of user equipments or each group of user equipments among all antennas of the base station [S302].

Subsequently, the base station may transmit DAS control information including information on the transmitting antenna corresponding per user equipment or user equipment group via a control channel, and preferably, via a dedicated control channel [S303].

Table 1 shows one example of DAS control information according to one embodiment of the present invention.

TABLE 1

DAS control information i   Number of transmitting antennas for a specific user equipment or a specific user equipment group
ii  Index information of a transmitting antenna a base station intends to use for a specific user equipment or a specific user equipment group
iii Information on received signal strength per transmitting antenna Referring to Table 1, DAS control information according to one embodiment of the present invention may include at least one of i) number of transmitting antennas which a base station intends to use for a corresponding user equipment, ii) index information of a transmitting antenna which a base station intends to use for a corresponding user equipment, and iii) a received signal strength for each transmitting antenna.

In this case, since transmitting antenna information on a corresponding user equipment may be changed in accordance with a location of the user equipment, distance from a base station antennas and the like, the DAS control information may be independently variable for each user equipment. Hence, the base station may be able to transmit the DAS control information by predetermined periods. Alternatively, the base station may be able to transmit the DAS control information only if necessary for an event occurrence in the user equipment or the base station or the like.

Subsequently, the base station may be able to transmit a signal on a transmitting antenna (or an antenna group) specified according to the antenna allocation information on the corresponding user equipment included in the DAS control information [S304].

Besides, the user equipment may perform channel estimation for each of one or more transmitting antennas specified to the corresponding user equipment based on the received signal and may be then able to transmit the corresponding feedback information to the base station (not shown in FIG. 3).

Figure 4:
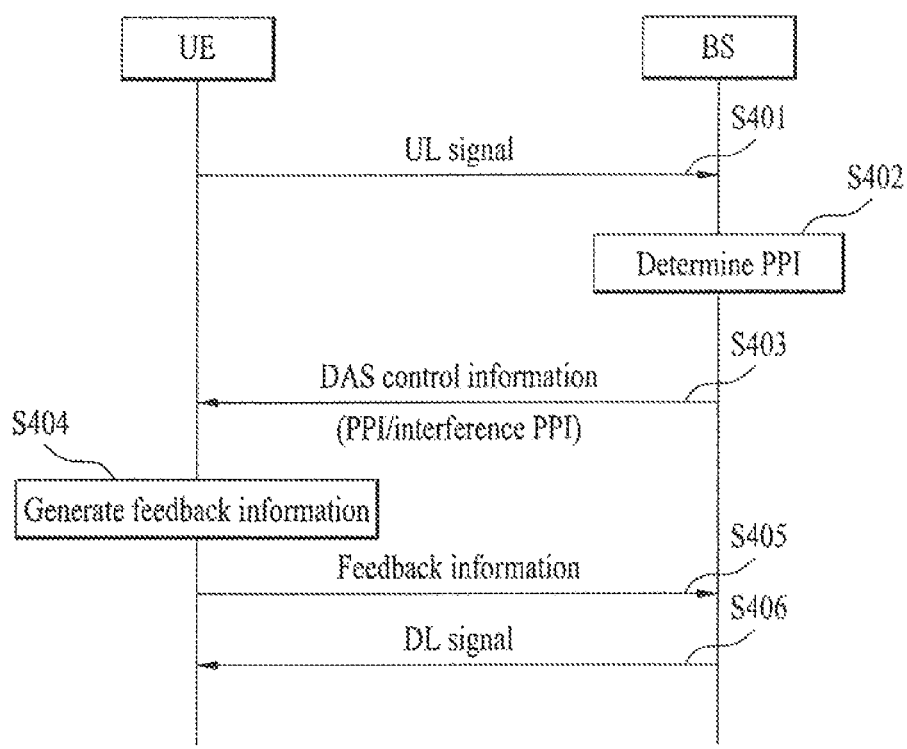
FIG. 4 is a diagram for another example of a process for transceiving signals between a base station and a user equipment in DAS according to one embodiment of the present invention.

FIG. 4 is a diagram for another example of a process for transceiving signals between a base station and a user equipment in DAS according to one embodiment of the present invention.

A DAS base station according to one embodiment of the present invention may be able to transmit antenna resource allocation information for allocating a specific antenna for each of user equipments among all antennas via pilot pattern information on the corresponding antenna.

In this specification, a pilot may include such a signal as a midamble configured independently for each antenna, a cell-common reference signal (CRS), a channel state information-reference signal (CSI-RS) and the like. Different pilot pattern may be independently used for each antenna or the same pilot pattern may be used for at least two antennas. For instance, in case that a plurality of antennas use the same pilot pattern, a user equipment receiving signals via the plurality of antennas may be able to recognize the received signals as a signal transmitted via a single antenna. Hence, in case that a pilot pattern index (PPI) is used as antenna resource allocation information, it may be represented as the number of independent pilot patterns allocated to antennas effectively specified to a corresponding user equipment instead of the number of physical antennas. For instance, if the number of transmitting antennas specified to a predetermined user equipment is 5 and the same pilot pattern is allocated to 3 of the 5 antennas, the PPI for the corresponding user equipment may be 3.

Referring to FIG. 4, a step S401 for a base station to receive such a UL signal as data, pilot, feedback information, ACK/NACK signal for data reception confirmation and the like from a user equipment [S401] and a step S402 of determining a transmitting antenna for the corresponding user equipment among all antennas of the base station based on a result of measuring a strength of the received UL signal may correspond to the former step S301 and the former step S302 shown in FIG. 3, respectively. In doing so, the base station may be able to determine a pilot pattern used by the antennas for the corresponding user equipment or the corresponding user equipment group instead of the antenna number and/or index information during allocating antenna resource per user equipment or user equipment group. In particular, for another example of antenna resource allocation, it may be able to determine PPI for each of user equipments or each of user equipment groups. For clarity of the following description, the same description shall be omitted.

Subsequently, the base station may transmit DAS control information including information on the transmitting antenna for the corresponding user equipment [S403].

Table 2 shows another example of DAS control information according to one embodiment of the present invention.

TABLE 2

DAS control information i   Pilot pattern indexes (PPI) for a user equipment or a user equipment group
ii  (Optional) Interference PPI supporting another user equipment in the vicinity of a corresponding user equipment Referring to Table 2, DAS control information according to one embodiment of the present invention may include pilot pattern indexes (PPI) as transmitting antenna allocation information for a user equipment.

And, the DAS control information may further include information on PPI (hereinafter named 'interference PPI') supportive of another user equipment in the vicinity of a corresponding user equipment optionally. For instance, the interference PPI may be defined as PPI that causes interference to a target user equipment because it supports a different user equipment despite affecting the target user equipment. The interference PPI may be transmitted at a time different from a time (e.g., period) of transmitting PPI or may not be transmitted. After a user equipment has received DAS control information including PPI, the user equipment may scan signals transmitted via pilot pattern other than PPI. If the user equipment is able to determine dominant signals as interference PPI among the scanned signals, separate interference PPI may not be included in the DAS control information.

Having received the DAS control information from the base station, the user equipment may be able to derive the information on the transmitting antenna supportive of the corresponding user equipment from the base station antennas via the PPI. Moreover, the user equipment generates feedback information by measuring channel related information including channel quality information (CQI), precoding matrix index (PMI), covariance matrix and the like [S404]. The user equipment may be then able to transmit the generated feedback information to the base station [S405].

In this case, if the interference PPI is included in the received DAS control information, the user equipment may derive the information on the interfering antennas for the corresponding user equipment using the interference PPI and may be then able to determine such feedback information as PMI for reducing interference and the like.

A method of configuring PMI for antennas to minimize interference for each of distributed antennas or each of antenna groups may be categorized into a best companion scheme and a worst companion scheme. If the best companion scheme is used, a user equipment determines PMI for minimizing interference effect from adjacent interfering antennas and may be then able to feed back the determined PMI to a base station. If the worst companion scheme is used, a user equipment determines PMI for maximizing interference effect from adjacent interfering antennas and may be then able to feed back the determined PMI to a base station. In particular, this feedback information may include such information as best/worst companion PMI of the interfering antennas for the corresponding user equipment.

The base station configures a precoding matrix for the transmitting antenna allocated to the corresponding user equipment in consideration of the PMI included in the feedback information to enhance reception performance and may be then able to transmit a downlink (DL) signal [S406].

Moreover, in case that the base station receives the PMI for the interfering antennas from a specific user equipment by feedback, the base station configures a precoding matrix to minimize interference on a specific user equipment in case of transmitting a signal to a different user equipment using the interfering antennas and may be then able to transmit a signal. Moreover, the base station may be able to change an antenna for the corresponding user equipment or an antenna group for the different user equipment.

2. 2$^{nd}$ Embodiment

Antenna Resource Allocation Via Downlink Signal Measurement

In a DAS operating method according to another embodiment of the present invention, a base station belonging to DAS may be able to determine a transmitting antenna or an antenna group for a user equipment based on feedback information on an antenna resource transmitted from the corresponding user equipment.

Figure 5:
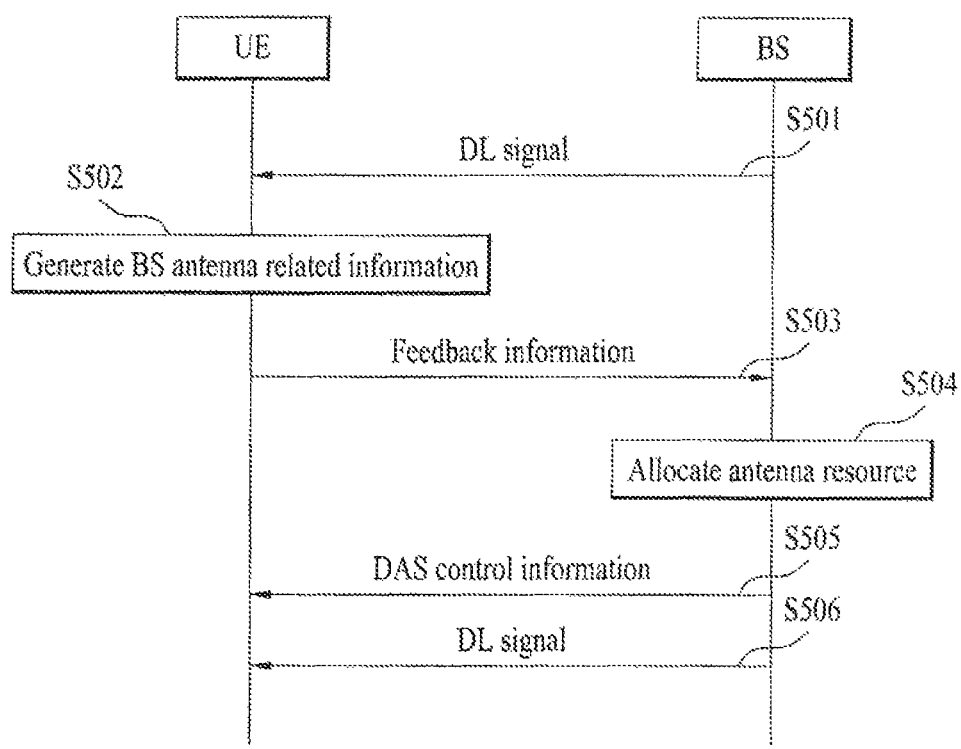
FIG. 5 is a diagram for another example of a process for transceiving signals between a base station and a user equipment in DAS according to one embodiment of the present invention.

FIG. 5 is a diagram for another example of a process for transceiving signals between a base station and a user equipment in DAS according to one embodiment of the present invention.

Referring to FIG. 5, a user equipment enters a cell area in which a DAS base station according to one embodiment of the present invention provides a service or is moving in a DAS area. In doing so, the user equipment receives a DL signal transmitted from the base station via at least one distributed antenna [S501]. The user equipment measures the received signal and may be then able to generate feedback information. For example, the feedback information may include related information on a transmitting antenna [S502].

Table 3 shows one example of feedback information generated by a user equipment belonging to DAS according to one embodiment of the present invention.

TABLE 3

| Feedback information |
|---|
| i   Received signal strength for each transmitting antenna used in DL |
| ii  Received signal strength of a transmitting antenna used for feedback by a user equipment among all transmitting antennas used in DL |
| iii Number of transmitting antennas requested again by a user equipment |
| iv  Number of transmitting antennas meeting an antenna resource selection reference |
| v   Index information of a transmitting antenna requested again by a user equipment among all transmitting antennas in DL |
| vi  Index information of a transmitting antenna meeting an antenna resource selection reference among all transmitting antennas in DL |

Referring to Table 3, the feedback information determined by a user equipment may include at least one of i) a received signal strength for each transmitting antenna used in DL, ii) a received signal strength of a transmitting antenna used for feedback by a user equipment among all transmitting antennas used in DL, iii) the number of transmitting antennas requested again by a user equipment, iv) the number of transmitting antennas meeting an antenna resource selection reference, v) index information of a transmitting antenna requested again by a user equipment among all transmitting antennas in DL, and vi) index information of a transmitting antenna meeting an antenna resource selection reference among all transmitting antennas in DL. Feedback information may be configured as a bitmap. In case that the transmitting antenna index information in v) and the transmitting antenna index information in vi) are transmitted via a bitmap, each bit configuring the bitmap may be configured to indicate a transmitting antenna index.

In this case, one example of the antenna resource selection reference may include a received signal strength of a DL signal. If a received signal strength measured for each transmitting antenna in a user equipment among all transmitting antennas in DL is equal to or greater than a threshold, a corresponding antenna may be selected as a transmitting antenna. In this case, the transmitting antennas selected by the user equipment in accordance with the antenna resource selection reference may include the transmitting antennas located in a distance adjacent to the corresponding user equipment as the antennas used by the base station to support different user equipments. And, the transmitting antenna may include an antenna supportive of different DAS zones as well.

The user equipment may be able to transmit the aforementioned feedback information to the base station [S503].

Having received the feedback information, the base station finally determines a transmitting antenna in downlink per user equipment. The determination of the antenna resource allocation may be made in the same manner of the received feedback information or in consideration of various conditions including feedback information, a load state of the base station, intra-cell user equipment distribution, cooperation with an adjacent cell and the like [S504]. Thus, the base station makes the determination by considering other conditions together with the feedback information. In particular, since the transmitting antennas selected by the user equipment in accordance with the antenna resource selection reference are the antennas used for the base station to support a different user equipment and are located in a distance adjacent to the corresponding user equipment, they may include the antennas that may cause interference effect to communication between the corresponding user equipment and the base station.

Subsequently, the base station may be able to transmit DAS control information including the information on the transmitting antenna finally determined for the corresponding user equipment on a control channel, and preferably, on a dedicated control channel [S505].

In doing so, the DAS control information includes i) the number of the transmitting antennas the base station intends to use for the corresponding user equipment, ii) the index information of the transmitting antenna the base station intends to use for the corresponding user equipment, and iii) the information on a received signal strength per transmitting antenna, which are described with reference to Table 1, and may further include iv) the number and/or index information of the transmitting antennas determined to be used for the corresponding user equipment by the base station among the transmitting antennas fed back by the corresponding user equipment.

Likewise, since the transmitting antenna information on the corresponding user equipment may be changed in accordance with a location of the user equipment, a distance from each of the base station antennas or the like, the DAS control information may be independently variable per user equipment. Hence, the base station may be able to transmit the DAS control information by predetermined periods. Alternatively, the base station may be able to transmit the DAS control information only if necessary for an event occurrence in the user equipment or the base station or the like.

Thereafter, the base station may be able to transmit a DL signal using the transmitting antenna finally determined for the corresponding user equipment [S506].

According to another embodiment of the present invention, a user equipment belonging to DAS transmits feedback information to a base station in a manner that information on a pilot pattern is included as well as information on a transmitting antenna.

Figure 6:
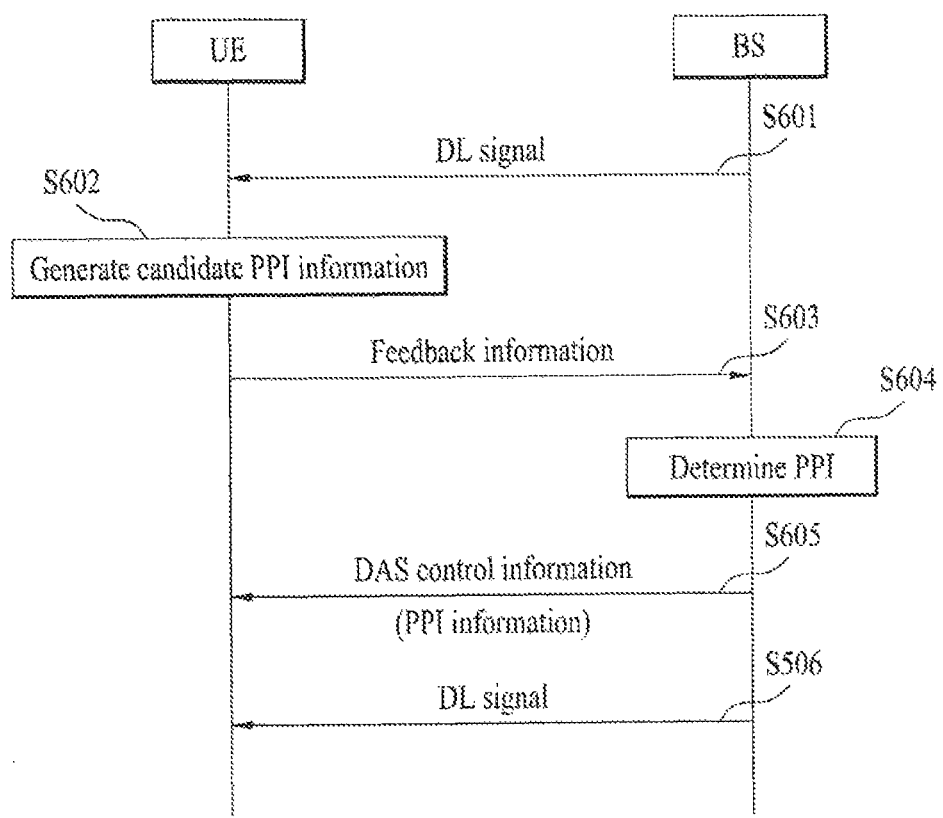
FIG. 6 is a diagram for another example of a process for transceiving signals between a base station and a user equipment in DAS according to one embodiment of the present invention.

FIG. 6 is a diagram for another example of a process for transceiving signals between a base station and a user equipment in DAS according to one embodiment of the present invention.

Referring to FIG. 6, a user equipment enters a cell area in which a DAS base station provides a service and may then receive a DL signal transmitted from the base station [S601].

Subsequently, the user equipment derives index information of a pilot pattern, which can be detected by the user equipment, via the received DL signal [S602].

In this case, the feedback information may further include vii) PPI information on transmitting antennas through DL signal measurement in the user equipment as well as the feedback information described with reference to Table 3. The PPI determined by the user equipment may not be equal to a PPI actually used by the base station in transmitting a DL signal to the corresponding user equipment. And, a PPI determined through a received signal in aspect of the user equipment may be named 'candidate PPI'.

Therefore, a candidate PPI determined by a user equipment may include a PPI supportive of communication with a different user equipment via an antenna located in an adjacent area of the corresponding user equipment by causing interference as well as a PPI efficiently usable for a communication between the corresponding user equipment and a base station. Yet, information on an interference PPI may be optionally included in feedback information. For instance, in a process described in the following, if a base station determines a PPI to use for a user equipment, it may be able to derive an interference PPI by comparing the determined PPI to a PPI included in feedback information. Hence, the interference PPI may not be included in the candidate PPI generated in the step S602.

The user equipment transmits the generated feedback information to the base station [S603]. The DAS control information may be independent and variable per user equipment. Hence, the base station may be able to transmit the DAS control information by predetermined periods. Alternatively, the base station may be able to transmit the DAS control information only if necessary for an event occurrence in the user equipment or the base station or the like.

Having received the feedback information, the base station may be able to finally determine a transmitting antenna for the corresponding user equipment in consideration of various conditions including a load state of the base station, intra-cell user equipment distribution, cooperation with an adjacent cell and the like based on the feedback information [S604].

Thereafter, the base station may be able to transmit the DAS control information including the information on the pilot pattern related to the transmitting antenna finally determined for the corresponding user equipment on a dedicated control channel [S605].

Another example of DAS control information according to one embodiment of the present invention is described with reference to Table 4.

TABLE 4

| DAS control information | Description |
| --- | --- |
| 1) Pilot Pattern Indexes (PPI) | i) PPI about transmitting antennas determined to use, ii) Index set (excluded PPI) about PPI to be excluded from fed-back candidate PPIs, iii) Indicator of index sum (Index Agreement Indicator) |
| 2) Radio resource information on PPI | Frequency/time division resource information of PPI determined to use |
| 3) Pilot sequence | Multiple orthogonal pilot sequence of PPI determined to use |
| 4) Additional pilot pattern information | Information on an added pilot pattern |

Referring to Table 4, DAS control information according to a further embodiment of the present invention includes 1) information on PPI supported for communication with a corresponding user equipment including at least one of: i) PPI information on transmitting antennas determined to use for the communication with the corresponding user equipment, ii) an index set (hereinafter named 'excluded PPI (e-PPI)') about PPI to be excluded from fed-back candidate PPI, and iii) Indicator (Index Agreement Indicator: IAI) of an index sum to indicate whether the same PPI of the candidate PPI included in the feedback information transmitted from a user equipment is used.

In this case, if 1 bit is allocated for the index agreement indicator (e.g., if the index agreement indicator is set to 1), it may indicate that the same PPI of the fed-back candidate PPI is used. If the index agreement indicator is set to 0, it may indicate that a PPI unequal to the fed-back candidate PPI is used.

If the base station determines to use the index unequal to the fed-back candidate PPI in the step S604, the PPI information i) can be included in the DAS control information. If the base station transmits the information on the PPI determined for the corresponding user equipment in a manner that the information on the determined PPI is included in the DAS control information, it may be efficient for a transmission of the antenna resource allocation information in case that the number of active user equipments is greater than the number of the base station antennas distributed in the cell area.

Alternatively, the base station may have the e-PPI information ii) included in the DAS control information. Since the user equipment generates the feedback information on the channel quality according to the DL signal measurement and the transmitting antennas feasible for the corresponding user equipment, the base station may be able to inform the user equipment of the e-PPI information, which is preferably excluded in suing a pilot pattern, instead of transmitting the whole PPI information determined to use for the corresponding user equipment. In doing so, the index agreement indicator may be set to 0 or may not be included in the DAS control information.

In case of transmitting e-PPI, the base station may separately signal e-PPI related information, which indicates whether the PPIs excluded from the feedback information are interference PPIs supportive of other user equipments or inactive, to the user equipment. Alternatively, the base station may transmit the e-PPI related information to the user equipment in a manner that the corresponding information is included in the DAS control information. For instance, while the base station is performing communication with the corresponding user equipment in accordance with a predetermined reference (e.g., if an interference rate of a specific antenna is equal to or greater than a predetermined reference) in the fed-back candidate PPIs, if the base station determines to turn off specific antennas, the base station may be able to inform the user equipment that the e-PPIs excluded from the feedback information are inactive.

In doing so, the e-PPI related information may be configured in a manner that indicators are enumerated in order preset for the PPIs excluded from the fed-back candidate PPIs. For instance, in case that the e-PPI related information is configured in a manner that 1-bit indicator corresponding to each pilot pattern is contiguously enumerated (e.g., ascending order, descending order, etc.), if the 1-bit indicator is set to 0, it may indicate that the e-PPI is inactive. If the 1-bit indicator is set to 1, it may indicate that the e-PPI is the interference PPI.

In case that the base station determines to use the PPI equal to the candidate PPI included in the feedback information in the step S604 of determining the transmitting antenna for the corresponding user equipment, the base station may be able to simplify a transmitted information size in a manner of transmitting the aforementioned index agreement indicator set to 1.

Thus, the transmission of the e-PPI information as the information on the transmitting antenna may be efficient for a case that the total number of antennas of the base station is greater than that of the active user equipments located within a cell area. This is useful for a case that the base station transmits the index agreement indicator only without transmitting separate information on PPI in a manner of using the PPI equal to the fed-back candidate PPI.

Referring to table 4, a base station may be able to transmit DAS control information in a manner that frequency/time division information of a pilot pattern used for a user equipment is further included in the DAS control information.

Regarding the frequency/time division information of the pilot pattern, this information is the information notified to a user equipment in case that a base station differently allocates frequency/time resources for antenna resource allocation per user equipment. In DAS, radio resources may be allocated in a manner of being multiplexed per antenna or antenna group. For instance, it may be able to use FDM scheme of dividing frequency band to use or TDM scheme of dividing time band to use.

For example, when a radio resource is allocated per antenna by FDM, if the distributed antennas 1, 2, 7 and 8 are allocated to the UE 1 shown in FIG. 1, all the antennas 1, 2, 7 and 8 may be configured to be used on a $1^{st}$ frequency band and the antennas 1, 2 and 7 may be configured to be used on a $2^{nd}$ frequency band only. Hence, a base station may be able to transmit resource information on frequency or time band, which is used for each of a plurality of specific antennas allocated to a specific user equipment, to a corresponding user equipment.

Referring to Table 4, a base station may be able to transmit DAS control information in a manner that pilot sequence information (e.g., multiple orthogonal pilot sequence information) in a pilot pattern used per user equipment or pilot pattern information added for pilot pattern addition is further included in the DAS control information.

In order to facilitate channel estimation, the user equipment may consider at least one of the frequency/time division information of pilot pattern used per user equipment, the pilot sequence information in the pilot pattern and the additional pilot pattern in the above-mentioned DAS control information.

The base station may be able to transmit the DAS control information by predetermined periods. Alternatively, the base station may be able to transmit the DAS control information only if necessary for an event occurrence in the user equipment or the base station or the like.

Thereafter, the base station may be able to transmit a signal using a specific transmitting antenna for a communication with the corresponding user equipment via the DAS control information [S607].

Meanwhile, according to a further embodiment of the present invention, a user equipment may be able to transmit PPI information preferred to be used for a communication with a base station. This is described with reference to Table 5 as follows.

Table 5 shows another example of feedback information generated by a user equipment belonging to DAS according to one embodiment of the present invention.

TABLE 5

| Feedback information |
|---|
| i  Received signal strength for each transmitting antenna used in DL |
| ii  Received signal strength of at least one transmitting antenna selected by a user equipment from all transmitting antennas used in DL |
| iii  Number of transmitting antennas requested again by a user equipment |
| iv  Number of transmitting antennas meeting an antenna resource selection reference |
| v  Index information of a transmitting antenna requested again by a user equipment among all transmitting antennas in DL |
| vi  Index information of a transmitting antenna meeting an antenna resource selection reference among all transmitting antennas in DL |
| vii  Preferred pilot pattern indexes (PPPI) information<br>① Channel state information estimated from each PPI belonging to PPPI<br>② Preferred order of pilot pattern indexes belonging to PPPI<br>③ Specific number of maximum preferred patterns and their channel state information among pilot pattern indexes belonging to PPPI |

Referring to Table 5, another example of feedback information according to one embodiment of the present invention may further include vii) preferred pilot pattern indexes (PPPI) information on transmitting antennas determined by a user equipment as well as the former feedback information described with reference to Table 3.

In this case, 'PPPI' may be defined as a pilot pattern index indicating that a received signal strength of a channel estimated via a common pilot, a channel gain or the like exceeds a predetermined threshold in aspect of a user equipment. The information on the PPPI may be transmitted by predetermined periods in accordance with a speed of a user equipment, a DAS antenna configuration or the like without being included in DAS control information. Alternatively, the information on the PPPI may be transmitted as a separate signal if necessary for a case of an event occurrence in a base station or a user equipment.

Moreover, as feedback information that can be provided together with the PPPI to raise performance of a base station in resource management such as scheduling between user equipments in a base station, resource allocation and the like, a user equipment may be able to transmit at least one of ① channel state information estimated from each PPI belonging to PPPI, ② preferred order of pilot pattern indexes belonging to PPPI, and ③ specific number (M) of maximum preferred patterns and their CSI (channel state information) among pilot pattern indexes belonging to PPPI.

The CSI is a general information related to a channel state and includes a channel coefficient, a channel gain, a covariance matrix related to the channel gain, modulation and coding level information and the like.

The ① CSI (channel state information) estimated from each PPI belonging to PPPI is to feed back a state information of a channel estimated from each pilot pattern and may be transmitted simultaneously with or separately from preferred orders of pilot pattern indexes belonging to PPPI.

Information on the ② preferred order of pilot pattern indexes belonging to PPPI is not separately signaled but may be notified in a manner of transmitting the ordered PPPI enumerated in preferred order in case of PPPI transmission.

The ③ specific number of maximum preferred patterns and their channels state information among pilot pattern indexes belonging to PPPI is to feed back a specific number of maximum preferred pilot patterns and channel states respectively corresponding to the pilot patterns to reduce overhead of the information ① and ②.

If the information on the specific number (M) of the maximum preferred pilot patterns is set in a manner of being included in a configuration parameter of a system, all user equipments entering a corresponding cell may be able to transmit the same number of maximum preferred pilot pattern index information. In case that a base station makes a determination of the corresponding information by a cell unit, a user equipment configures feedback information in accordance with a maximum preferred number (M) in PPPI transmitted by a base station. Hence, since the corresponding information may vary in accordance with indication information transmitted by the base station, it may be independent for each user equipment. In case that a user equipment arbitrarily makes the determination, the corresponding information may depend on such a reference as the number of CSIs having a link quality exceed a specific threshold, a required data size, a preference and the like.

If it is instructed to feed back a specific number of PPPIs in accordance with an indication made by a base station among PPPIs determined by a user equipment or a preset specific number of maximum preferred pilot pattern index information in an initial configuration of a corresponding system is transmitted with ordered PPPI, CSI (hereinafter named best-M CSI) on a predetermined number (M) of channels in most upper state can be transmitted together. In particular, the feedback information including PPPI according to one embodiment of the present invention may include at least one of the ordered PPPI transmitted in the preferred order, CSI corresponding to the ordered PPPI and all PPPI, and the ordered PPPI and best-M CSI.

The base station receiving the feedback information exemplarily shown in Table 5 may be able to transmit the DAS control information described with reference to Table 4 to the user equipment. Yet, in this case, the DAS control information may be able to include at least one of i) PPI information on transmitting antennas determined to use for the communication with the corresponding user equipment, ii) an index set (hereinafter named 'excluded PPI (e-PPI)') about PPI to be excluded from fed-back candidate PPI, and iii) Indicator (Index Agreement Indicator: IAI) of an index sum to indicate whether the same PPI of the candidate PPI included in the feedback information transmitted from a user equipment is used.

Theses feedback information are the information usable when a base station belonging to DAS determines to allocate a transmitting antenna per user equipment. Theses feedback information may be transmitted by feedback by predetermined periods in accordance with a speed of a user equipment, a DAS antenna configuration or the like. Alternatively, these feedback information may be transmitted in case of an event occurrence in a user equipment.

In case that DAS is used in 3GPP LTE, feedback information according to embodiments of the present invention may be transmitted to a base station via a physical uplink control channel (PUCCH) or a physical uplink control channel (PUSCH). In case that DAS is used in IEEE 802.16, feedback information according an embodiment of the present invention may be transmitted to a base station via an uplink primary fast feedback channel (PFBCH) or an uplink secondary fast feedback channel (SFBCH). Alternatively, the feedback information may be transmitted on a channel newly defined for DAS.

3. 3$^{rd}$ Embodiment

Deriving Logical Antenna Index from Pilot Pattern Index

In a conventional CAS based communication system, since all physical antennas of a base station join in transmission and reception with users, it may be unnecessary to discriminate a logical antenna index (LAI) or PPI from physical antenna indexes (PAI).

Yet, in a DAS based communication system, since a plurality of antennas may use the same pilot pattern, each user equipment may operate by recognizing DAS antenna not on the basis of PAI but on the basis of PPI. In particular, in aspect of a user equipment, PAI and PPI may be discriminated from each other.

In DAS, each antenna is allocated to a specific one of antenna sets each of which consists of a partial set of all available PPI or PAI. For instance, referring to FIG. 1, assuming that all antennas of DAS system are 8Tx and that the system is set to have PPI=PAI=8, when a base station transmits data on 4Tx by allocating PPI of antennas #1, #2, #7 and #8 to UE 1, if the user equipment attempts to feed back PMI, it may have to select a most upper matrix from a precoding matrix codebook corresponding to 4Tx.

In doing so, column vectors (or row vectors) of each codebook should be mapped to the antennas #1, #2, #7 and #8, respectively. And, indexes for providing this process consistently and serially are required.

Moreover, according to the above-described embodiments of the present invention, in case that PPI used per user equipment is determined and information on the PPI is transmitted, each user equipment derives channel related information such as CQI, PMI, covariance matrix and the like using the received PPI and may be then able to transmit the derived channel related information to a base station by feedback. Since PPIs allocated per user equipment are an arbitrary partial set of an available PPI set, consistent and serial antenna indexes are required in order for each user equipment to use and measure information related to a channel using the PPIs.

Therefore, according to another embodiment of the present invention, a DAS base station may be able to use LAI as index information on a base station antenna used for a communication with each user equipment. In this case, assuming that the number of maximum base station antennas corresponding to a specific user equipment is set to N_Tx(k), the LAI may be configured with integers ranging 0 to maximum 'N_Tx(k)–1' or ranging 1 to N_Tx(k).

A base station antenna corresponding to each user equipment may include one of a transmitting antenna used for a base station to transmit a DL signal to a specific user equipment, a base station antenna interfering with a specific user equipment and an interfering antenna interfering with a specific user equipment. For instance, the UE 1 shown in FIG. 1 may be able to receive a signal from at least one of the antennas 1, 2, 7 and 8. And, the antenna 7 may correspond to an interfering antenna located within a coverage supportive of the UE 1 and may have an interference influence on the UE 1 while supporting the UE 2. Hence, the antennas corresponding to the UE 1 include all antennas actually used by a base station to transmit data to the UE 1 and the corresponding interfering antennas, and more particularly, the antennas 1, 2, 7 and 8.

Thus, in aspect of a user equipment, since the number of base station antennas for transmitting data may not be equal to the number of interfering antennas, LAIs may be discriminated into two different types such as dedicated LAI and interfering LAI for example.

Figure 7:
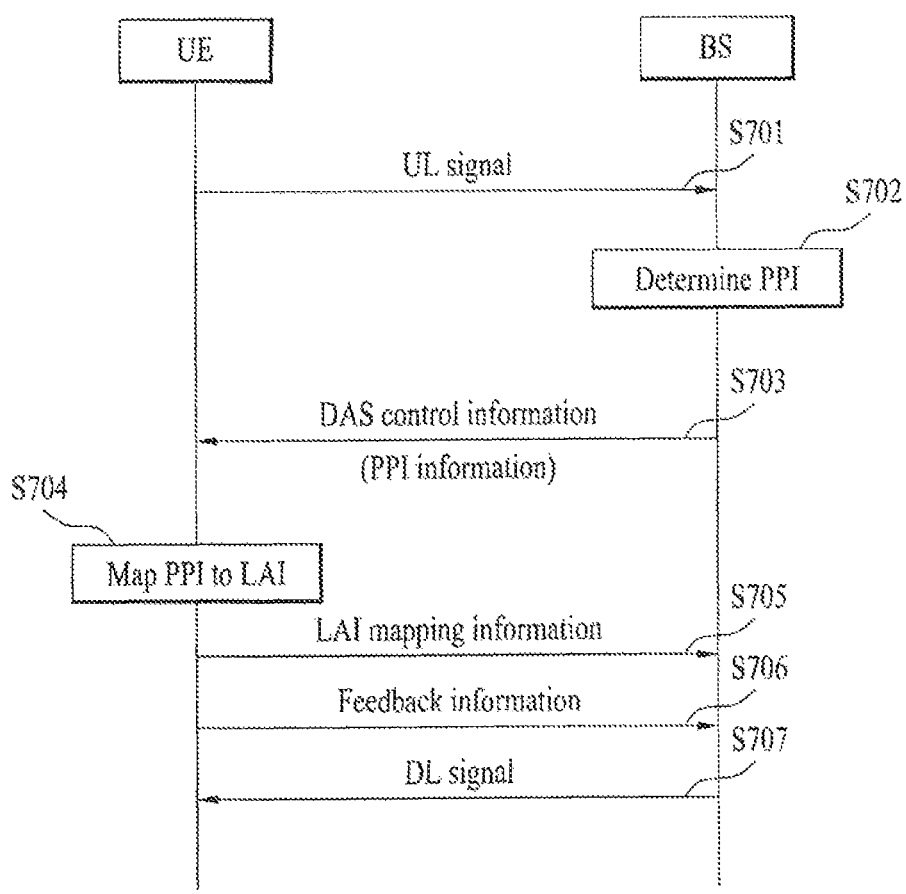
FIG. 7 is a diagram for one example of a process for a DAS base station to transmit signals to a user equipment according to one embodiment of the present invention.

FIG. 7 is a diagram for one example of a process for a DAS base station to transmit signals to a user equipment according to one embodiment of the present invention. This process may be performed in the same manner of the former embodiment described with reference to FIG. 4.

Referring to FIG. 7, since a step S701 for a base station to receive a UL signal from a user equipment, a step S702 for the base station to determine PPI for the corresponding user equipment among all antennas of the base station based on a result of measuring strength of the received UL signal, and a step S703 of transmitting DAS control information including PPI as information on a transmitting antenna may correspond to the former steps S401 to S403 shown in FIG. 4, their details shall be skipped for clarity of the following description.

In this case, the DAS control information includes the former PPI described with reference to Table 2, which is to be used for each user equipment, and may optionally include information on the interfering PPI having an interference influence on the corresponding user equipment.

Having received the DAS control information, the user equipment performs a process for mapping the received PPI to LAI [S704]. The process for mapping the PPI or PAI to the LAI may be performed in a manner of configuring the LAI in ascending or descending order or mapping the PAI in accordance with such a specific performance reference as a power gain per PPI and the like. Mapping PPI or PAI to LAI may be performed in the same manner of uplink or downlink or by an independent scheme.

Meanwhile, since the base station should be aware of this corresponding relation between PPI or PAI and LAI, the user equipment may be able to transmit information on an LAI mapping rule to the base station [S705].

Subsequently, the user equipment selects PMI from a precoding matrix codebook based on the configured LAI, generates feedback information by measuring channel related information such as CQI, covariance matrix and the like, and may be then able to transmit the generated feedback information to the base station [S706]. In particular, the feedback information is transmitted simultaneously together with the LAP mapping information or may be transmitted by separate signaling.

Thereafter, the base station may be able to transmit a DL signal to the user equipment via the determined PPI [S707].

In particular, in UL signal transmission, the user equipment converts a channel corresponding to base station receiving antenna PPI or PAI to LAI and may be able to use it for channel estimation and related precoding. The base station converts a signal received via antennas corresponding to the reception PPI or PAI of the corresponding user equipment to LAI having serial property and may then perform decoding.

The signal transceiving process between the DAS base station and the user equipment according to one embodiment of the present invention described with reference to FIG. 7 shows one example for a base station to determine an antenna specified to a user equipment by measuring a UL signal.

On the other hand, a user equipment selects at least one or more antennas corresponding to the user equipment from all antennas of a base station based on a result of measuring a DL signal and may be then able to perform mapping PPI or PAI to LAI on the corresponding antennas.

Figure 8:
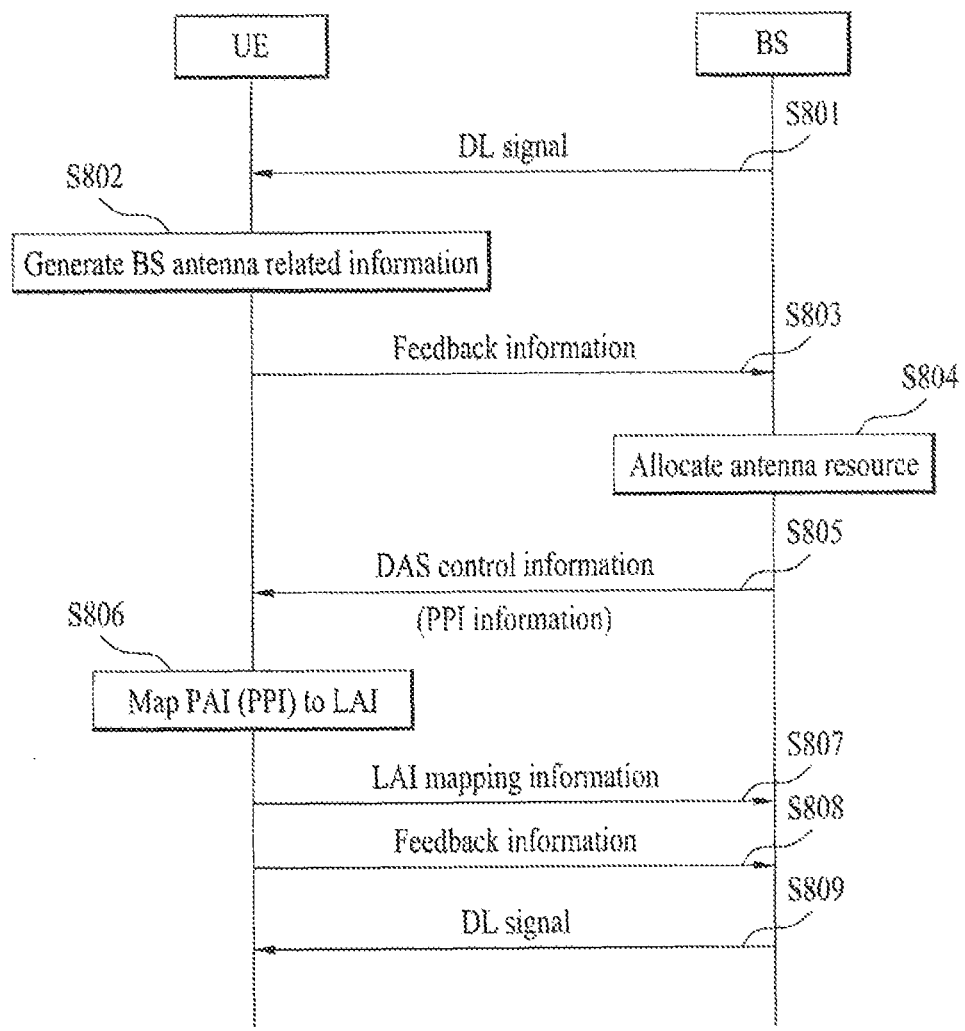
FIG. 8 is a diagram for another example of a process for a DAS base station to transmit signals to a user equipment according to one embodiment of the present invention.

FIG. 8 is a diagram for another example of a process for a DAS base station to transmit signals to a user equipment according to one embodiment of the present invention. This process may be performed in the same manner of the former embodiment described with reference to FIG. 6.

Referring to FIG. 8, a user equipment receives a DL signal transmitted from a base station [S801].

The user equipment generates information on a transmitting antenna in a manner of measuring the received signal and then selecting antennas each of which meets received signal strength or the like [S802] and may be then able to transmit the generated information to the base station [S803].

For instance, a physical antenna set of DAS system having 32 base station antennas is 'PMI set={1, 2, . . . 32}. In this case, if 4 PAIs spaced far apart from each other are mapped by one PPI using 8 PPIs (i.e., PPI set={1, 2, . . . 8}, antennas 1, 9, 17 and 25 can be regarded as using the same pilot pattern. Hence, 'PAI set={1, 9, 17, 25}' may be mapped to 'PPI=1'. The user equipment determines 'PPI set={1, 2, 4}' configured with PPIs, each of which meets a received signal strength over a predetermined reference, among 8 PPIs at its location and may be then able to transmit feedback information on the determination to the base station.

Having received a UL signal including the feedback information, the base station may be then able to determine an antenna, which can be specified to a communication with the corresponding user equipment, via the feedback information, the UL reception strength and the like [S804].

According to the above embodiment, the base station may be able to determine to use the antennas 9, 10 and 12 (i.e., PAI set={9, 10, 12}) for the corresponding user equipment based on the received signal strength among the transmitting antennas corresponding to 'PPI set={1, 2, 4} in the feedback information transmitted from the corresponding user equipment.

Subsequently, the base station transmits DAS control information including the information on the transmitting antenna finally determined for the corresponding user equipment to the user equipment [S805]. The base station may inform the corresponding user equipment that DL data will be transmitted via 3Tx of the antennas 9, 10 and 12 (i.e., PAI set={9, 10, 12}) to the corresponding user equipment.

Having received the information on the finally determined transmitting antenna via the DAS control information, the user equipment performs a process for mapping the received PPI to LAI [S806]. According to the above embodiment, if the user equipment sets a power gain per PPI with reference to performance, the mapping may be performed in a manner of establishing one-to-one correspondence between 'LAI={1, 2, 3}' and 'PPI={2, 1, 4}' in order of each per-PPI power gain in 'PPI={1, 2, 4}'.

Subsequently, the user equipment may be able to transmit by feedback the LAI mapping information, which indicates the mapping to LAI with reference to a power gain size of each PPI, to be base station [S807]. In doing so, since the user equipment fed back the preferred pilot pattern index (PPPI) in the preferred order in the step S802, if the PPI is mapped to the LAI in the preferred PPI order, the base station may be able to derive the mapping information indicating that the user equipment has mapped the PI to the LAI. Hence, it may be unnecessary to transmit the separate mapping information in the step S806.

Subsequently, the user equipment derives channel related information based on the established LAI and may be then able to transmit the derived channel related information to the base station by feedback [S808]. For instance, when the number of antenna of a user equipment is 1, channel coefficients $h_1$, $h_2$ and $h_3$ corresponding to LAI 1, LAI 2 and LAI 3 are estimated using channels estimated from 'PPI set={1, 2, 4}' and all vector channels 'h=[$h_1$, $h_2$, $h_3$]' can be then derived through the estimated channel coefficients. When a 3 tx precoding matrix codebook consists of 3 rows×r columns matrixes (where r is the number of data streams, i.e., 3), it may be able to find PMI and CQI through size comparison and the like by performing inner product on each of the matrixes of the codebook by h. Alternatively, when such information on a channel as a channel coefficient, a covariance matrix and the like is transmitted to a base station, it may be able to use a channel sorted by LAI.

Since the number of physical antennas corresponding to each user equipment belonging to DAS is not identical, a range of LAI may not be identical for each user equipment. Hence, a physical antenna index (PAI), a pilot pattern index (PPI) and a logical antenna index (LAI) may not be identical for one user equipment.

Thereafter, the base station may be able to transmit a DL signal to the user equipment using the transmitting antenna determined to use for the corresponding user equipment [S809].

In uplink, a user equipment converts a channel corresponding to PPI (or PAI) for a UL receiving antenna to LAI, performs channel estimation using the LAI, and may then transmit a precoded signal to a base station. Having received the precoded signal, the base station converts signals received from antennas corresponding to the reception PPI (or PAI) of the corresponding user equipment to LAI having serial property and may then perform decoding.

Meanwhile, in case that an LAI mapping method according to one embodiment of the present invention is applied to LTE/LTE-A system, an antenna port index (API) may be mapped to LAI. To this end, PAI is mapped to API and the API may be then mapped to LAI.

DAS control information according to embodiments of the present invention may be able to configure antenna resource allocation, which is used for one user equipment, to differ per frequency band by applying a case of using FDM for radio resource allocation. In case that antenna resource allocation differing per frequency band is applied, feedback information and/or DAS control information according to embodiments of the present invention may be transmitted per frequency band.

In doing so, by transmitting an indicator indicating whether feedback information and/or DAS control information of the rest of the frequencies except the specific frequency band is different from that of the specific frequency band, a transmitted information size may be reduced or a transmission accuracy may be raised. In particular, feedback information and/or DAS control information may be transmitted on a specific frequency band for a corresponding user equipment and an indicator indicating whether the feedback information and/or DAS control information transmitted on the specific frequency band is independent from that transmitted on the rest of the frequency band except the specific frequency band may be transmitted.

Therefore, if feedback information and/or DAS control information transmitted on a specific frequency band is identical to feedback information and/or DAS control information transmitted on a frequency band other than the specific frequency band, an indicator indicating the identity is transmitted only. Otherwise, feedback information and/or DAS control information corresponding to the corresponding frequency band may be transmitted only.

Alternatively, only if information transmitted on a discriminated frequency band is not identical without transmitting a separate indicator, feedback information and/or DAS control information, which is to be transmitted, may be transmitted on a corresponding frequency band.

The above-described embodiments of the present invention may be performed on an independent network configured with DAS cells only in a system supportive of DAS or may be used together with a conventional CAS supportive system.

In case of a system using CAS and DAS together, a base station may be able to transmit information indicating that DAS is supported for user equipments entering a cell in the corresponding system.

When user equipments initially enter a DAS supportive cell, a base station according to one embodiment of the present invention may be able to broadcast a broadcast information including cell ID information, DAS support indication information indicating whether a corresponding system supports DAS, and the like into a cell area. In this case, the broadcast information may include the cell ID information, the DAS support indication information, information on a pilot pattern used in a corresponding cell, information on the number of maximum pilot patterns to support and the like.

In doing so, the base station may be able to directly notify the user equipments, which initially enter the cell, whether the base station supports CAS or DAS through the DAS support indication information.

Alternatively, DAS support indication information may be configured to be included in cell ID information. In case that the DAS support indication information is indicated via the cell ID information, cell ID is configured to include information for discriminating CAS and DAS from each other. Hence, a user equipment having received the cell ID may be able to derive whether the base station currently supports CAS or DAS through the cell ID.

For instance, a cell ID in IEEE 802.16 system is hierarchically classified in accordance with a base station type such as a macrocell base station (BS), a hot zone base station (BS), a femto cell base station (BS) and the like. When the cell ID is configured in accordance with a type of a corresponding base station, an upper or lower layer may be discriminated to indicate whether the corresponding base station supports CAS or DAS. In IEEE 802.16 system, cell ID is broadcasted via PA-preamble and SA-preamble.

For another instance, in LTE-A, a base station transmits cell ID into a cell area via CRS. In doing so, a portion of a signal configuring the cell ID may be assigned as a signal indicating a DAS supportive system. Alternatively, it may be able to configure a separate cell ID by classifying a system into CAS or DAS.

Base station and user equipment belonging to DAS for implementing embodiments of the present invention are described with reference to FIG. 9 as follows.

Figure 9:
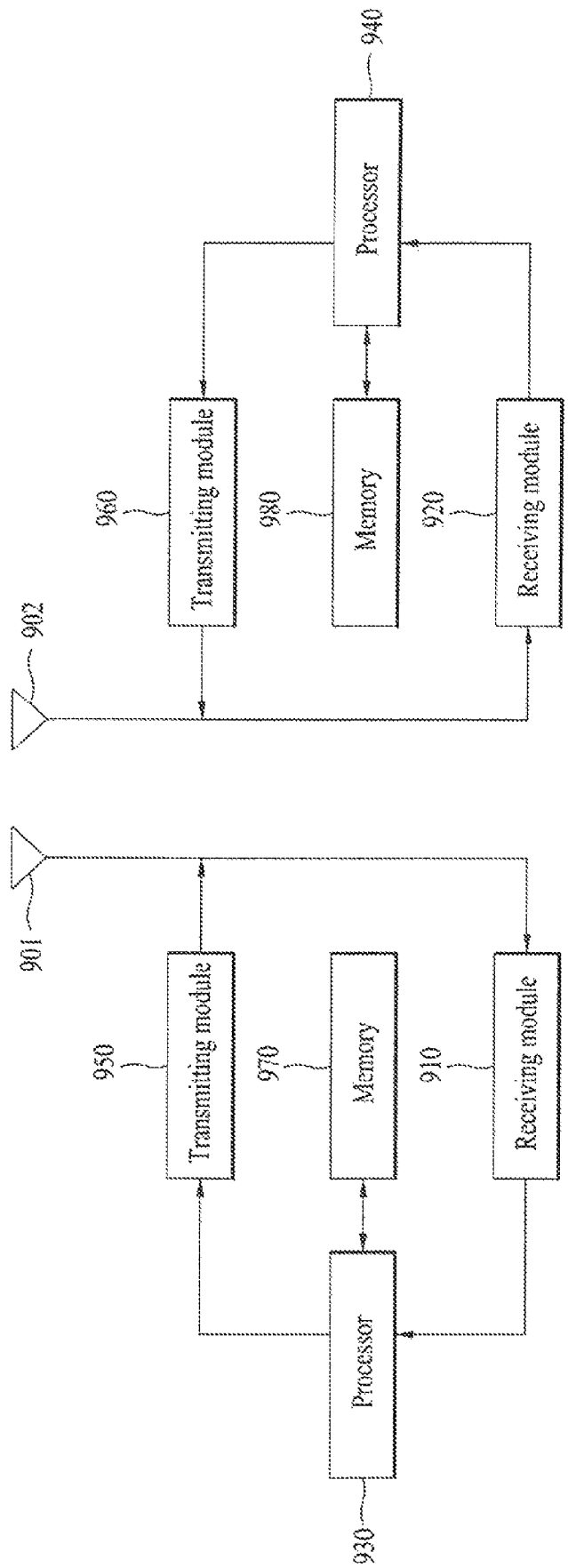
FIG. 9 is a block diagram of a base station and a user equipment to implement embodiments of the present invention.

FIG. 9 is a block diagram of a base station and a user equipment to implement embodiments of the present invention.

First of all, a user equipment works as a transmitter in uplink and is able to work as a receiver in downlink. A base station works as a receiver in uplink and is able to work as a transmitter in downlink. In particular, each of the user equipment and the base station includes a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like.

Referring to FIG. 9, a left part in the drawing represents a base station belonging to DAS with a structure of a transmitter, while a right part in the drawing represents a user equipment entering a cell, which enters a cell serviced by the DAS base, with a structure of a receiver. The transmitter/receiver may include an antenna 901/902, a receiving module 910/920, a processor 930/940, a transmitting module 950/960 and a memory 970/980.

The antenna 901/902 includes a receiving antenna performing a function of receiving a radio signal externally and then delivering the received radio signal to the receiving module 910/920 and a transmitting antenna externally transmitting a signal generated from the transmitting module 950/960. In case that a multiple-antenna (MIMO) function is supported, at least two antennas can be provided to the user equipment or the base station.

The antenna 901 of the transmitter shown in FIG. 9 indicates at least one DA selected from all antennas of the base station based on a channel state, a location of the user equipment, a distance between the base station and the user equipment and the like in the course of communication. The selected at least one DA is not fixed but may be changeable in accordance with a location change of the receiver or the like.

The receiving module 910/920 reconstructs the radio signal received externally via the antenna into original data in a manner of performing decoding and demodulation on the received radio signal and may be then able to deliver the reconstructed original data to the processor 930/940. The receiving module and the antenna may not be separated from each other as shown in FIG. 9. Instead, the receiving module and the antenna may be represented as a receiving unit configured to receive a radio signal.

The processor 930/940 generally controls overall operations of the transmitter or the receiver. In particular, the processor 930/940 may be able to perform a controller function for performing the above-described embodiments of the present invention, a MAC (medium access control) frame variable control function according to service characteristics and propagation environment, a handover function, an authentication function, an encryption function and the like.

The transmitting module 950/960 performs predetermined coding and modulation on a signal and/or data, which is scheduled by the processor 930/940 and will be then transmitted externally, and may be then able to deliver the coded and modulated signal and/or data to the antenna. The transmitting module and the antenna may not be separated from each other as shown in FIG. 9. Instead, the transmitting module and the antenna may be represented as a transmitting unit configured to transmit a radio signal.

The memory 970/980 may store programs for processing and control of the processor 930/940 and may be able to perform a function of temporarily storing input/output data (e.g., in case of the user equipment, UL grant allocated by the base station, system information, station identifier (STID), a flow identifier (FID), an action time, etc.).

And, the memory 970/980 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 930 of the transmitting stage performs overall control operations on the base station. The processor 930 may perform antenna resource allocation for selecting a transmitting antenna or an antenna group for each user equipment according to the embodiments of the present invention described with reference to FIG. 3 to 8 or may be able to configure a pilot pattern index (PPI) corresponding to each user equipment.

The processor 930 of the transmitting stage may be able to configure DAS control information including configuration information on DAS system, information on a antenna or an antenna group to be used for a communication with each user equipment or information on PPI.

The receiver receives the signal and DAS control information transmitted from the transmitter via the receiving module 920 and may be then able to acquire various configuration information on the DAS system and the information on the antenna or the antenna group used for the communication with the transmitter.

The processor 940 of the receiver performs overall control operations on the user equipment. The processor 940 may be able to generate feedback information on a channel state by measuring a DL signal transmitted from the transmitter. Moreover, the processor 940 determines a base station antenna corresponding to the receiver through a received signal strength of the DL signal by the embodiments described with reference to FIG. 5 and FIG. 6 and may be then able to inform the transmitter of the information on the determination. Moreover, the processor 940 converts PPI or PAI transmitted from the transmitter by the embodiments described with reference to FIG. 7 and FIG. 8 to LAI, generates feedback information based on the LAI, and may be then able to transmit the generated feedback information to the transmitter.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

Accordingly, embodiments of the present invention are applicable to a base station, a user equipment and other devices in a wireless communication system.

What is claimed is:

1. A method of receiving, by a user equipment, downlink signals, the method comprising:
   receiving, by the user equipment, one or more pilot pattern configurations each having a pair of pilot information indexes consisting of:
      a first pilot information index for downlink channel state estimation, and
      a second pilot information index for interference measurement; and
   transmitting, by the user equipment, feedback information according to the one or more pilot pattern configurations, the feedback information including a result of at least the downlink channel state estimation and the interference measurement information,
   wherein the first pilot information index is related to at least information on a time-frequency resource for a pilot pattern and information on a number of transmission antennas of a base station used for the user equipment.

2. The method of claim 1, further comprising:
   receiving a bitmap of which each bit indicates whether a corresponding pilot pattern is an interfering pilot pattern.

3. The method of claim 1, further comprising:
   receiving, by the user equipment, indication information indicating that the user equipment receives the downlink signals from a plurality of antenna groups which are spaced apart from each other.

4. A user equipment for receiving downlink signals, the user equipment comprising:
   a receiver configured to receive a downlink signal;
   a transmitter configured to transmit an uplink signal; and
   a processor configured operatively connected to the receiver and the transmitter, the processor configured to:
      receive one or more pilot pattern configurations each having a pair of pilot information indexes consisting of:
         a first pilot information index for downlink channel state estimation, and
         a second pilot information index for interference measurement; and
      transmit feedback information according to the one or more pilot pattern configurations, the feedback information including a result of at least the downlink channel state estimation and the interference measurement information,
   wherein the first pilot information index is related to at least information on a time-frequency resource for a pilot pattern and information on a number of transmission antennas of a base station used for the user equipment.

5. The user equipment of claim 4, wherein the processor is further configured to receive a bitmap of which each bit indicates whether a corresponding pilot pattern is an interfering pilot pattern.

6. The user equipment of claim 4, wherein the processor is further configured to control the receiving module to receive indication information indicating that the user equipment receives the downlink signals from a plurality of antenna groups which are spaced apart from each other.

7. A method of transmitting, by a base station, downlink signals, the method comprising:
   transmitting, to a user equipment, one or more pilot pattern configurations each having a air of pilot information consisting of:
      a first pilot information index for downlink channel state measurements, and
      a second pilot information index for interference measurement; and
   receiving feedback information according to the one or more pilot pattern configurations, the feedback information including a result of at least the downlink channel state estimation and the interference measurement information,
   wherein the first pilot information index is related to at least information on a time-frequency resource for a pilot pattern and information on a number of transmission antennas of the base station used for the user equipment.

8. A base station for transmitting downlink signals, the base station comprising:
   a transmitter configured to transmit a downlink signal;
   a receiver configured to receive an uplink signal; and
   a processor operatively connected to the receiver and the transmitter, the processor configured to:
      transmit, to a user equipment, one or more pilot pattern configurations each having a pair of pilot information indexes consisting of:
         a first pilot information index for downlink channel state measurements, and
         a second pilot information index for interference measurement; and
      receive feedback information according to the one or more pilot pattern configurations, the feedback information including a result of at least the downlink channel state estimation and the interference measurement information,
   wherein the first pilot information index is related to at least information on a time-frequency resource for a pilot pattern and information on a number of transmission antennas of the base station used for the user equipment.

\* \* \* \* \*